United States Patent [19]

Kondo

[11] Patent Number: 5,532,683
[45] Date of Patent: Jul. 2, 1996

[54] PAGING RECEIVER AND RADIO FREQUENCY CHANNEL SEARCHING METHOD FOR THE SAME

[75] Inventor: Hisashi Kondo, Tokyo, Japan

[73] Assignee: NEC Corporation, Tokyo, Japan

[21] Appl. No.: 135,560

[22] Filed: Oct. 14, 1993

[30]     Foreign Application Priority Data

Oct. 14, 1992   [JP]   Japan .................................. 4-276126

[51] Int. Cl.$^6$ ................................................. H04B 1/16
[52] U.S. Cl. .............................. 340/825.03; 340/825.44; 455/38.3; 455/161.3; 455/164.1; 455/343
[58] Field of Search ......................... 340/825.03, 825.44, 340/825.48; 455/38.1, 38.3, 38.5, 150.1, 179.1, 185.1, 161.1–161.3, 164.1, 340, 343; 379/57

[56]             References Cited

U.S. PATENT DOCUMENTS

| | | | |
|---|---|---|---|
| 4,247,947 | 1/1981 | Miyamoto | 455/38.1 |
| 4,802,201 | 1/1989 | Yoshizawa et al. | 379/62 |
| 5,280,642 | 1/1994 | Hirata et al. | 455/161.3 |

FOREIGN PATENT DOCUMENTS 60-96913   5/1985   Japan ................................. 455/161.3

*Primary Examiner*—Michael Horabik
*Attorney, Agent, or Firm*—Sughrue, Mion, Zinn, Macpeak & Seas

[57]                 ABSTRACT

A paging receiver is provided for use with a plurality of paging service systems transmitting different radio frequency channels. The paging receiver searches for every reception channel and determines object reception channels by referring to system information identifying each service system, and contains an electric field detection section for detecting the electric field strength of radio frequency channels and a reception channel control section for controlling searching for radio frequency channels and determining object reception channel. The reception channel control section immediately switches the radio frequency channel when the received electric field strength is not greater than a prescribed value and when the system information does not exhibit coincidence, but when the system information exhibits coincidence, determines that the radio frequency channel being received is an object radio frequency channel and continues receiving of the paging information. Accordingly, the time required for searching all radio frequency channels remarkably decreases thereby preventing degradation of the battery.

5 Claims, 4 Drawing Sheets

PAGING RECEIVER AND RADIO FREQUENCY CHANNEL SEARCHING METHOD FOR THE SAME

BACKGROUND OF THE INVENTION

1. Field of the Invention

This invention relates to a paging receiver, and more particularly to a paging receiver for use with a plurality of paging systems having different radio frequencies.

2. Description of the Prior Art

In a paging receiver for use with a plurality of paging service systems which use different radio frequency channels, the receiver must search a radio frequency band in which the radio frequency channels are included and receive the radio frequency channels selectively in order to distinguish for each of channels successively received whether or not the paging receiver itself is entitled to use the channel. To this end, each radio frequency channel includes system information for identification of the paging system, and the receiver compares the system information included in channels successively received with the system information held by the receiver itself. Then, when the system information coincides with the information held by the receiver, the receiver fixes the local frequency in order to continue the reception of the channel as an object channel and to identify subsequent paging information, but when the information does not coincide, the receiver changes the local frequency in order to change the reception channel to the next order radio frequency channel.

In this instance, conventional searching operations of the receiver are performed similarly for channels not being transmitted (not operated) and for channels whose received electric field strength is so low that the signals cannot be received correctly, and since a time of several hundred milliseconds is required to receive a minimum unit of transmission signals for every reception channel, the time required to search for, for example, 16 radio frequency channels is as long as several seconds.

Consequently, a long time is required before the receiver enters a battery saving condition, resulting in degradation of the life of the battery. Further, there is another drawback in that, as the time for searching for all radio frequency channels increases, the probability increases that the paging receiver will fail to receive a paging call sent to the paging receiver.

SUMMARY OF THE INVENTION

It is an object of the present invention to provide a paging receiver and a radio frequency channel searching method for the paging receiver that can remarkably decrease the time required for searching for a plurality of radio frequency channels and accordingly decrease the time required to determine an object radio frequency channel for which reception should be continued, thereby preventing degradation of the battery.

To achieve the above objects, there is provided a paging receiver which: searches for the radio frequency channels of a plurality of paging systems, each channel including system information for identification of said paging systems; receives the radio frequency channels in order by changing from one to the next; and determines that a radio frequency channel being received is an object radio frequency channel whose reception should be continued if system information included in the radio frequency channel being received coincides with the system information held by said paging receiver itself; said paging receiver comprising:

electric field detection means for detecting the received electric field strength of a radio frequency channel being received; and reception channel control means for controlling the searching for radio frequency channels and determining an object reception channel, wherein said control means immediately switches from the radio frequency channel being received to a next radio frequency channel when the received electric field strength is not greater than a prescribed value, inquires coincidence of system information when the received electric field strength is greater than the prescribed value, and switches from the radio frequency channel being received to a next radio frequency channel when the system information does not exhibit coincidence, but when the system information exhibits coincidence, determines that the radio frequency channel being received is an object radio frequency channel.

The paging receiver further comprises storage means for storing information regarding a received electric field and in addition, information regarding coincidence of system information of a received radio frequency channel, wherein the information can be used for rearrangement of the searching order of reception channels in succeeding searching cycles.

According to another aspect of this invention, there is provided a radio frequency channel searching method for a paging receiver which: searches for radio frequency channels of a plurality of paging systems, each channel including system information for identification of the paging systems; receives the radio frequency channels in order by switching from one to the next; and determines that a radio frequency channel being received is an object radio frequency channel whose reception should be continued if system information included in said radio frequency channel being received coincides with system information held by said paging receiver itself; said radio frequency channel searching method comprising the steps of:

setting an arbitrary radio frequency channel as a provisional reception channel and detecting the strength of the received electric field of the reception channel;

immediately switching the reception channel setting to a next radio frequency channel when the received electric field strength is not greater than a prescribed value;

comparing the system information included in the reception channel with the system information held by said receiver when the received electric field strength is greater than the prescribed value;

switching the reception channel setting to a next radio frequency channel when the system information does not exhibit coincidence; and when the system information exhibits coincidence, determining the radio frequency channel being received as an object radio frequency channel.

The searching method further comprises the steps of:

storing information regarding a received electric field of each received channel and in addition, information regarding coincidence of system information of each received radio frequency channel;

rearranging the searching order of reception channels in the succeeding cycle of searching by using the information.

DESCRIPTION OF THE PREFERRED EMBODIMENTS

Embodiments of the present invention are described below with reference to the drawings.

Figure 1:
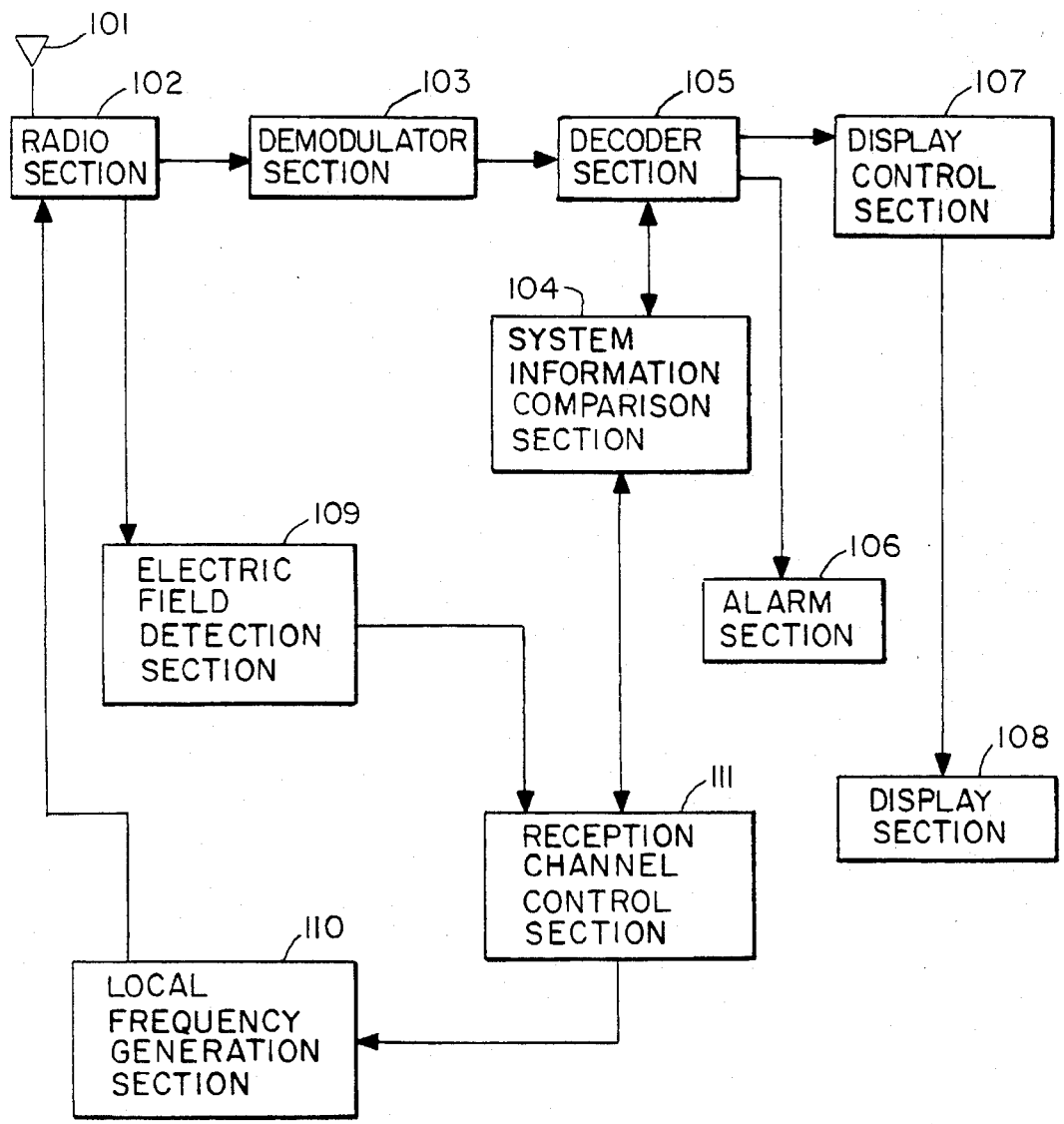
FIG. 1 is a block diagram of a paging receiver of a first embodiment of the present invention.
Figure 3:
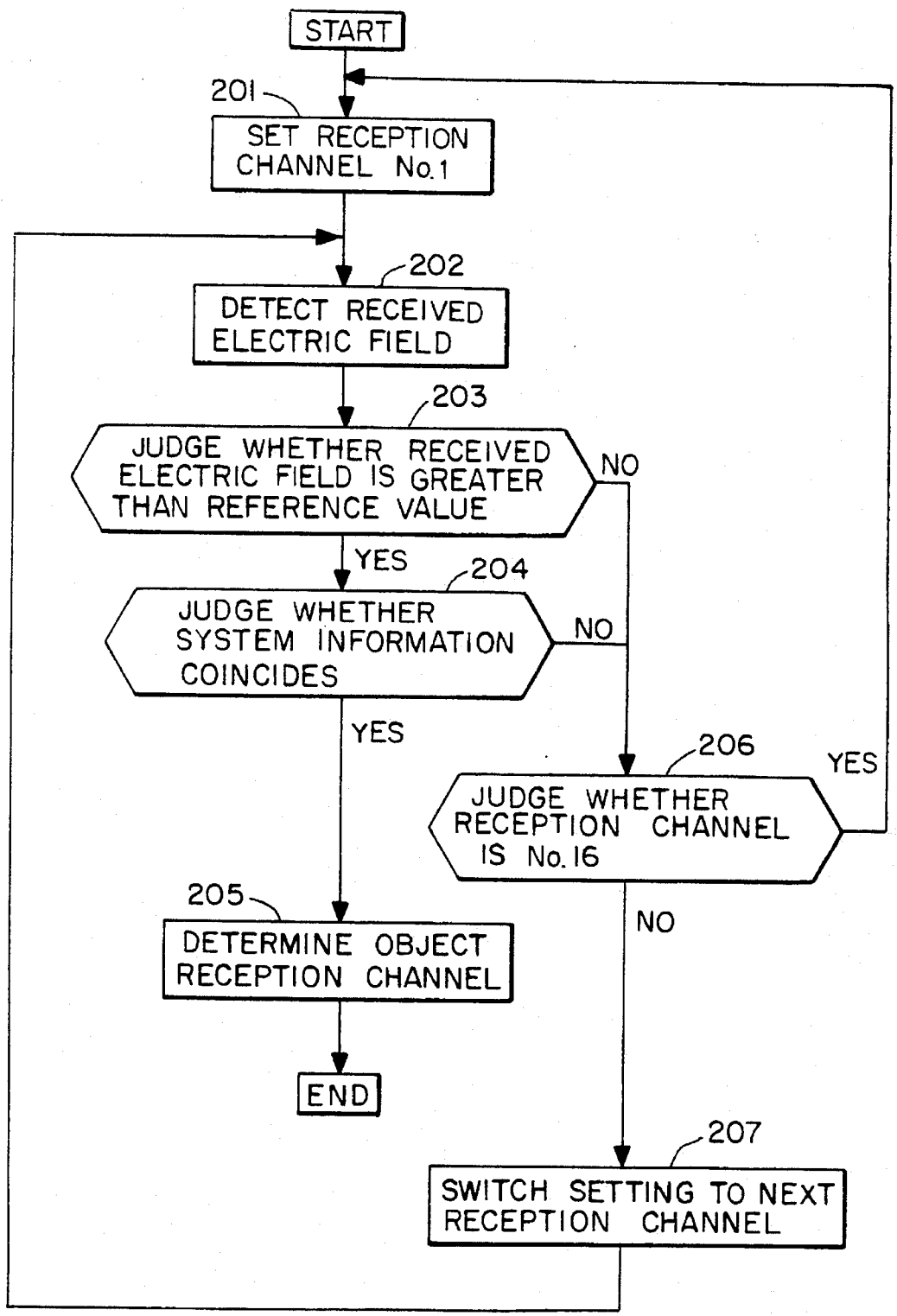
FIG. 3 is a flow chart showing the process of the radio frequency channel searching operation of the paging receiver of FIG. 1.

FIG. 1 is a block diagram of a paging receiver of a first embodiment of the present invention, and FIG. 3 is a flow chart showing the process of the radio frequency channel searching operation of the paging receiver of FIG. 1.

The paging receiver of FIG. 1 can receive paging call signals transmitted in different radio frequency channels from a plurality of paging systems and includes an antenna 101, a radio section 102, a demodulator section 103, a decoder section 105, an alarm section 106, a display control section 107, a display section 108, a system information comparison section 104, an electric field detection section 109, a local frequency generation section 110 and a reception channel control section 111.

The antenna 101 and the radio section 102 selectively receive a radio frequency channel corresponding to a local frequency supplied thereto from the local frequency generation section 110 controlled by the reception channel control section 111. The signal of the received radio frequency channel is demodulated into a paging signal, shaped in waveform and converted into a digital signal by the demodulation section 103, and then sent to and decoded by the decoder section 105.

The thus-decoded paging signal includes system information for identification of that specific paging system, paging number information allocated to the paging receiver and display information to be displayed on the display section 108 of the receiver.

The electric field detection section 109 detects the electric field strength of the radio frequency channel received by the radio section 102 through the antenna 101 and sends it to the reception channel control section 111. The reception channel control section 111 compares the received electric field strength with a predetermined reference value. If the received electric field strength is greater than the fixed reference value, the system information comparison section 104 that receives the result of the comparison of the electric field strength makes a determination whether or not the decoded system information and system information held in advance by the receiver coincide with each other. A signal indicative of coincidence or noncoincidence is sent out from the system information comparison section 104 to the decoder section 105 and the reception channel control section 111.

When coincidence of the system information is determined, the local frequency is fixed, and the decoder section 105 determines whether or not the demodulated paging number and a paging number held in advance by the receiver coincide with each other. If they coincide with each other, the decoder section 105 drives the alarm section 106 and simultaneously sends the demodulated display information to the display control section 107 so that the display information is displayed on the display section 108.

Next, a radio frequency channel searching operation of the paging receiver of FIG. 1 that is awaiting a paging call to the receiver itself is described with reference to FIG. 3. In this case, it is assumed that the paging receiver can receive a total of 16 paging channels from No. 1 to No. 16, and that the paging receiver searches for these channels in numerical order beginning with No. 1.

When the receiver is switched on by a user, the reception channel control section 111 informs the local frequency generation section 110 of generation of a local frequency corresponding to channel No. 1 and sets the reception channel provisionally to No. 1 (step 201). The electric field detection section 109 connected to the radio section 102 detects the strength of the received electric field (step 202), and the reception channel control section 111 compares the received electric field strength with the predetermined reference value to check whether or not the received electric field strength is greater than the reference value (step 203).

Here, when the received electric field strength is equal to or lower than the reference value, the reception channel control section 111 checks to determine whether or not the reception channel is set to No. 16 (step 206). If the reception channel is not set to No. 16, the reception channel control section 111 immediately informs the local frequency generation section 110 of the change of local frequency so that another local frequency corresponding to a next radio frequency channel is sent out to switch the reception channel setting to the next channel (step 207). However, if the reception channel is set to No. 16, a second searching cycle beginning with channel No. 1 and ending with channel No. 16 is started (steps 206 and 201).

When the received electric field strength is higher than the reference value, the system information comparison section 104, to which the result of the comparison of the field strength has been transmitted from the reception channel control section 111, performs comparison of the system information and sends out the result of the comparison to the reception channel control section 111 and the decoder section 105.

Here, when the system information does not exhibit coincidence (step 204), the reception channel control section 111 checks the reception channel to determine whether or not it is set to No. 16. If the reception channel is not set to No. 16, the reception channel control section 111 delivers an instruction to change the reception channel setting (steps 206 and 207), but if the reception channel is set to No. 16, a second searching cycle beginning with channel No. 1 is started (steps 206 and 201).

When the system information exhibits coincidence, the reception channel control section 111 determines that the reception channel is the object channel and continues the reception of the same channel by fixing the local frequency through the local frequency generation section 110 (steps 204 and 205), and the decoder section 105 proceeds to comparison of the paging number information.

In the series of searching operations, when the reception channel is successively switched to finally arrive at No. 16, thereby completing one cycle, without determining an object reception channel for which searching operation should be continued, the reception channel returns provisionally to channel No. 1 to begin a second searching cycle. Thus, the series of searching operations is repeated until an object reception channel is determined or until the number of searching cycles reaches a given number without determining an object reception channel.

It is to be noted that, while it is described above that the searching order is first set so that the searching begins with channel No. 1, the searching may otherwise be performed beginning with any given channel on condition that the channel No. 1 follows the channel No. 16.

Next, another paging receiver of a second embodiment is described with reference to FIGS. 2 and 4.

Figure 2:
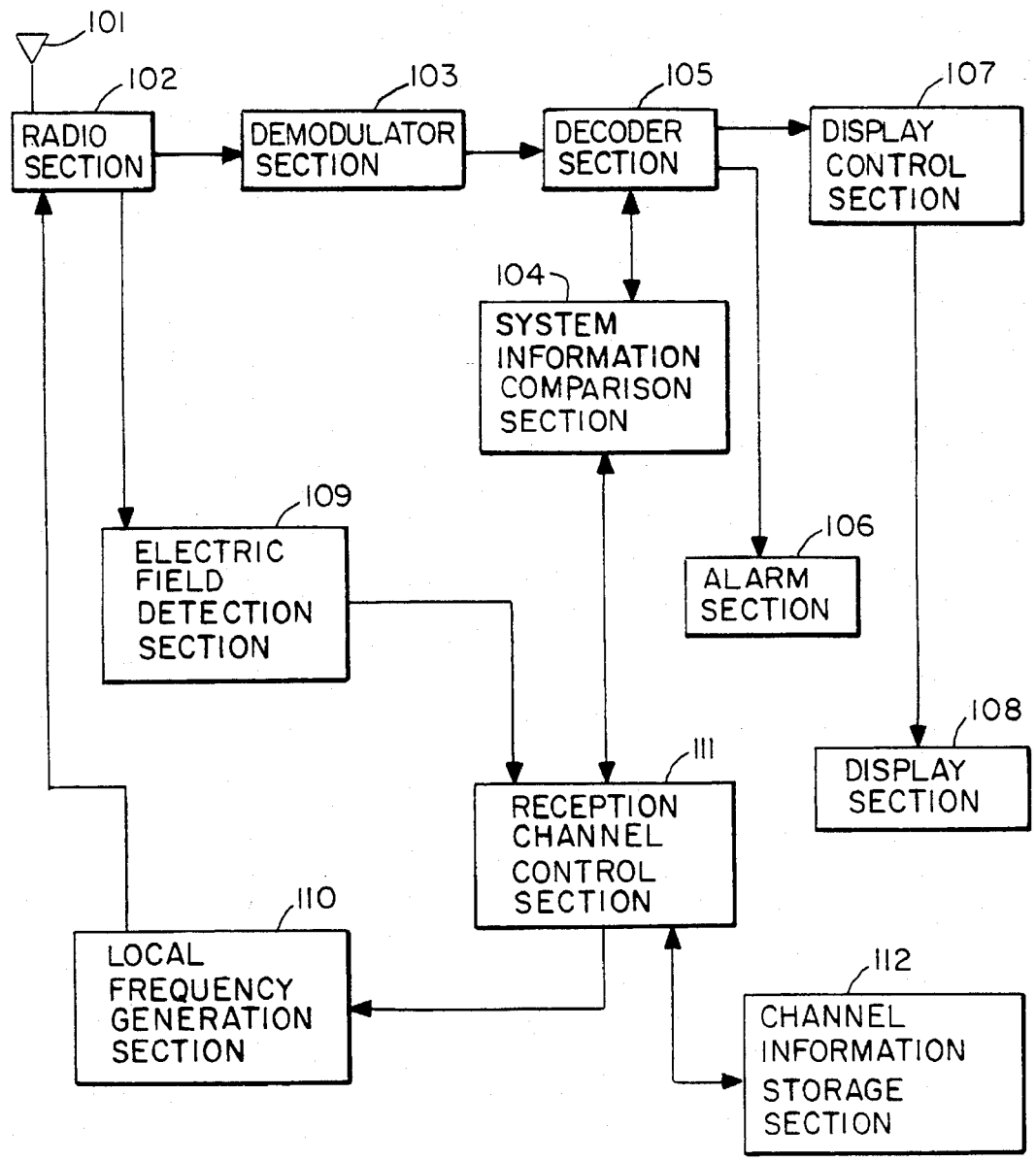
FIG. 2 is a block diagram of a paging receiver of another embodiment of the present invention.

The receiver of FIG. 2 is different in construction from the receiver of FIG. 1 in that it includes a channel information storage section 112. The channel information storage section 112 stores together with the channel number the received electric field strength information sent from the electric field detection section 109, and the result of comparison of the received electric field strength and the predetermined reference value sent by the reception channel control section 111. The channel information storage section 112 also stores the result of comparison of the system information included in each reception channel and the system information held in the receiver. Consequently, the reception channel control section 111 can make use of the information stored in the channel information storage section 112 in order to allow the paging receiver to more efficiently perform the succeeding cycle of searching operation. FIG. 4 illustrates an example of a searching operation procedure including a second and succeeding cycles that are performed more efficiently by making use of the information stored in the channel information storage section 112 in the proceeding cycles.

Figure 4:
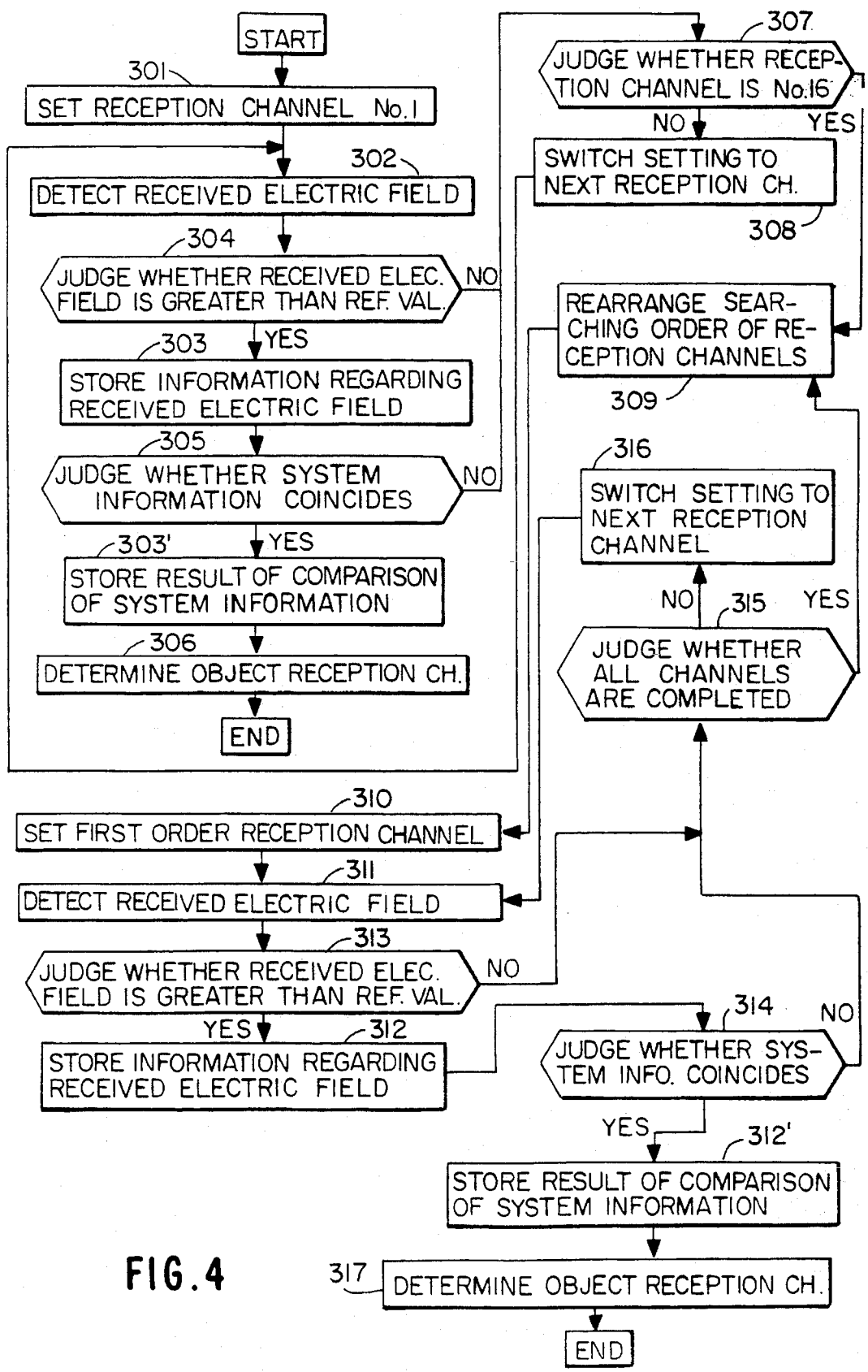
FIG. 4 is a flow chart showing the process of the radio frequency channel searching operation of the paging receiver of FIG. 2.

Referring to FIG. 4, step 303, in which received electric field information is stored into the channel information storage section 112, follows step 304, in which it is determined whether or not the received electric field strength is greater than the reference value. Step 303', in which the result of comparison of system information is stored into the channel information storage section 112, follows step 305, in which it is determined whether or not the received system information coincides with the system information held in the receiver.

When the first searching cycle is completed from the channel No. 1 to channel No. 16 without determining an object reception channel (step 307), the second searching cycle is started. Here, using the information stored in the channel information storage section 112 in previous steps 303 and 303', rearrangement of the order of the reception channels is performed in order to allow the second cycle of searching operations to be performed efficiently (step 309), and a first radio frequency channel after the rearrangement is set as the provisional reception channel (step 310). Thereafter, searching is performed similarly to the first searching cycle. When the steps of the search are completed for all of the channels after the rearrangement without determining an object reception channel (step 315), rearrangement for a third searching cycle is performed (step 309).

For the rearrangement of the order of the reception channels at step 309, two methods are available including a first method wherein only those channels which exhibited received electric fields not greater than the reference electric field in the last searching cycle are arranged in the order in which the searching was performed, and a second method wherein rearrangement is performed including, in addition to those channels just described, those channels whose received electric fields were greater than the reference electric field in the last searching cycle but which did not exhibit coincidence of system information. The latter method is considered an effective procedure when the person carrying the paging receiver is moving at a high speed.

The searching operation of FIG. 4 is performed repeatedly until an object reception channel is determined or until the number of searching cycles reaches a fixed number.

What is claimed is:

1. A battery-operated paging receiver, which searches for radio frequency channels of a plurality of paging systems, said radio frequency channels having system information for identification of said paging systems, which receives the radio frequency channels in a certain order by incrementally switching among the radio frequency channels in said certain order, and which determines that a radio frequency channel being received is an object radio frequency channel whose reception should be continued if the system information included in the radio frequency channel being received coincides with system information held by said paging receiver, said paging receiver comprising:

a battery saving means for preventing the degradation of useful battery life, said battery saving means comprising an electric field detection means for detecting received electric field strength of a radio frequency channel being received;

storage means for storing information regarding a received electric field of a radio frequency channel received from said electric field detection means;

system information comparison means for determining whether or not said system information included in said radio frequency channel being received coincides with said system information held by said paging receiver; and reception channel control means for controlling the searching for radio frequency channels and determining the object radio frequency channel, wherein said reception channel control means immediately switches the radio frequency channel being received to a next radio frequency channel when the received electric field strength is not greater than a prescribed value, wherein said reception channel control means confirms from said system information comparison means if the system information exhibits coincidence when said electric field strength is greater than said prescribed value, and wherein said reception channel control means switches the radio frequency channel being received to said next radio frequency channel when said system information does not exhibit coincidence and determines that the radio frequency channel being received is the object radio frequency channel when the system information exhibits coincidence, and wherein said reception channel control means rearranges the certain order of searching the radio frequency channels for a next searching cycle to be executed by using the received electric field information stored in said storage means.

2. The paging receiver as claimed in claim 1, further comprising storage means for storing information regarding the coincidence of system information, wherein said reception channel control means rearranges the certain order by further using a result of coincidence of system information.

3. The paging receiver as claimed in claim 1, wherein a synthesizer is equipped as an oscillator for generating reception local frequencies corresponding to the radio frequency channels.

4. A radio frequency channel searching method for a battery-operated paging receiver which searches for radio frequency channels of a plurality of paging systems, said radio frequency channels having system information for identification of said paging systems, which receives the radio frequency channels in a certain order by incrementally switching among the radio frequency channels in said certain order, and which determines that a radio frequency channel being received is an object radio frequency channel whose reception should be continued if system information included in said radio frequency channel being received coincides with system information held by said paging receiver, said radio frequency channel searching method comprising the steps of:

setting an arbitrary radio frequency channel as a provisional reception channel and detecting the received electric field strength of the reception radio frequency channel;

storing information regarding a received electric field of each radio frequency channel;

immediately switching the reception channel setting to a next radio frequency channel when the received electric field strength is not greater than a prescribed value so as to prevent the degradation of battery life by reducing the time for conducting a search;

comparing system information included in the reception channel with system information held by said receiver when the received electric field strength is greater than the fixed value;

switching the reception channel setting to the next radio frequency channel when said system information included in the reception channel does not coincide with said system information held by said receiver; and when the system information exhibits coincidence, determining the radio frequency channel being received as said object radio frequency channel; and when said object radio frequency channel is not determined, rearranging the certain order of said information regarding the received electric field strength of said radio frequency channels and executing the searching for the object radio frequency channel.

5. The radio frequency channel searching method as claimed in claim 4, further comprising storing information regarding coincidence of system information of each radio frequency channel, and rearranging the certain order of searching the radio frequency channels in succeeding cycles of searching by further using the information of said coincidence of system information.

* * * * *